United States Patent
Schmutz et al.

[15] 3,683,084
[45] Aug. 8, 1972

[54] BASICALLY SUBSTITUTED HETEROCYCLES AS ANTI-EMETICS

[72] Inventors: Jean Schmutz, Pourtalesstrasse 36, Muri; Fritz Hunziker, Wabernstrasse 53, Berne; Franz Martin Kunzle, Landoltstrasse 11, Berne, all of Switzerland

[22] Filed: July 16, 1970

[21] Appl. No.: 55,602

Related U.S. Application Data

[63] Continuation-in-part of Ser. No. 797,281, Feb. 6, 1969, Pat. No. 3,546,226, which is a continuation-in-part of Ser. Nos. 371,123, May 28, 1964, abandoned, and Ser. No. 712,956, March 14, 1968, abandoned.

[52] U.S. Cl. ..............................424/250
[51] Int. Cl. ..............................A61k 27/00
[58] Field of Search........................424/250

[56] References Cited

UNITED STATES PATENTS 3,458,516  7/1969  Howell et al..............424/250

Primary Examiner—Jerome D. Goldberg
Attorney—Gerald D. Sharkin, Frederick H. Weinfeldt, Robert S. Honor, Walter F. Jewell and Richard E. Vila

[57] ABSTRACT

Certain 11-basically substituted dibenz[b,f][1,4]oxazepines are useful as anti-emetics.

3 Claims, No Drawings

BASICALLY SUBSTITUTED HETEROCYCLES AS ANTI-EMETICS

This application is a continuation-in-part of our pending application, Ser. No. 797,281, filed Feb. 6, 1969, which issued as U.S. Pat. No. 3,546,226 on Dec. 8, 1970 which in turn is a continuation-in-part of our earlier applications, Ser. No. 371,123, filed May 28, 1964 now abandoned and Ser. No. 712,956, filed Mar. 14, 1968 now abandoned.

This invention is concerned with pharmaceutical compositions containing dibenz[b,f][1,4]oxazepines and their use as anti-emetics.

The active agents with which this invention is concerned may be represented by the following structural formula:

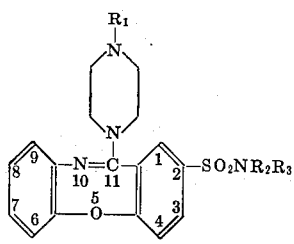

(I)

and acid addition salts thereof. In formula I, $R_1$ represents hydrogen, allyl, alkyl containing not more than three carbon atoms, hydroxyalkyl containing not more than three carbon atoms, alkoxyalkyl containing not more than six carbon atoms or alkoyloxyalkyl containing not more than six carbon atoms; $R_2$ and $R_3$ are the same or different and represent hydrogen or methyl.

Compounds of formula I are obtained when a compound of the formula:

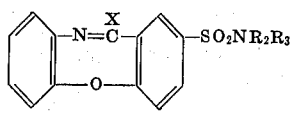

(II)

wherein $R_2$ and $R_3$ have the meaning defined above and X denotes a residue capable of being split off with the hydrogen of amines, is reacted with piperazine or a piperazine derivatives, respectively, of the formula:

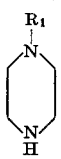

(III)

wherein $R_1$ has the above-mentioned meaning.

A residue capable of being split off with the hydrogen of amines, which can be bound ionically or covalently to the carbon atom, can most conveniently be represented by halogen, sulphydryl, or alkoxy and alkylthio which may be activated, e.g. methoxy, thiomethyl or p-nitrobenzylthio, or by tosyl.

Starting materials of the formula II are obtained by converting lactams of the formula:

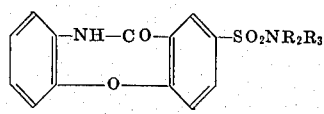

(IV)

wherein $R_2$ and $R_3$ have the meaning given above, into the thiolactams which may be followed by alkylation, or by reaction of the lactams with a halogenating agent such as phosphorus oxychloride or phosphorus pentachloride, most suitably in the presence of a catalytic amount of dimethylaniline or dimethylformamide. Lactams of formula IV are themselves obtained by ring closure of compounds of the formula:

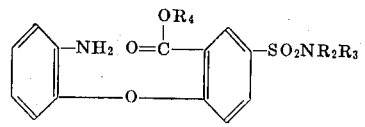

(V)

wherein $R_2$ and $R_3$ have the above-mentioned meaning and $R_4$ denotes hydrogen or lower alkyl. Lactams of formula IV may also be obtained by ring closure of compounds of the formula:

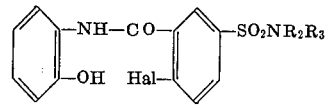

(VI)

wherein Hal stands for halogen, or of isocyanates of the formula:

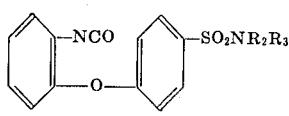

(VII)

Compounds of formula I may further be obtained by ring closure through intramolecular condensation of acid amides or acid thioamides of the formula:

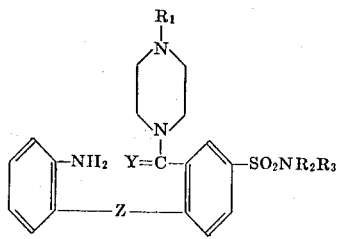

(VIII)

wherein $R_1$, $R_2$ and $R_3$ have the above-mentioned meaning and Y represents oxygen or sulphur. A purely thermal condensation rarely succeeds with the acid amides but rather with the thioamides which are, for example, obtained from the acid amides by treatment with phosphorus pentasulphide and need not be isolated before the following condensation. Especially in the case of the acid amides it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. the condensation of the thioamides is favored by the presence of mercury(II) salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline.

Compounds of formula I can also be obtained by dehydration of urea derivatives of the formula:

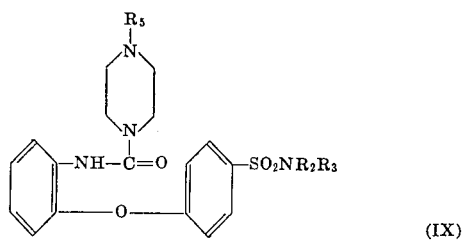

(IX)

wherein $R_2$ and $R_3$ have the above-mentioned meaning and $R_5$ means $R_1$ or denotes a removable group, especially a hydrolytically removable group. The ring closure is preferably carried out by heating in the presence of dehydrating agents such as zinc chloride, aluminum chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting materials of formula IX with a hydrolytically removable group $R_5$, e.g. carbalkoxy, especially carbethoxy, are cyclicized directly to the 11-(1-piperazinyl) compounds by hydrolysis of the removable group. Other removable groups can be split off after ring closure in a way known per se, e.g. by hydrogenolysis.

The products of formula can also be obtained when amidines of the formula:

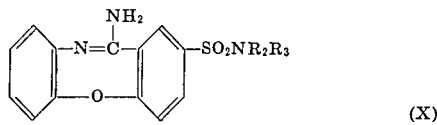

(X)

wherein $R_2$ and $R_3$ have the above-mentioned meaning, are treated with a reactive ester of an alcohol of the formula:

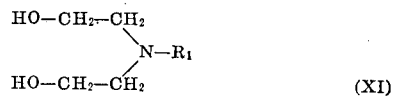

(XI)

wherein $R_1$ has the above-mentioned meaning. The reaction is carried out following or by simultaneous treatment with a basic catalyst or metallization agent such as sodamide, lithium amide, sodium hydride, butyl lithium, phenyl sodium, sodium ethylate or potassium-t-butoxide. Suitable esters are those of inorganic or organic acids, e.g. hydrohalic acid, sulphonic acid or carbonic acid esters. The required amidines X are in turn obtained by treating compounds of formula II with ammonia.

Finally, compounds of formula I, are obtained when the corresponding compounds containing the group $-SO_2X$ instead of aminosulphonyl, wherein X denotes a residue which is removable with the hydrogen of amines, especially halogen, are reacted with ammonia or an amine of the formula $HNR_2R_3$, wherein $R_2$ and $R_3$ have the above defined meaning. Starting materials containing a sulphochloride group ($-SO_2Cl$) are obtained by diazotization of the corresponding amino compounds followed by the Meerwein reaction.

Compounds of formula I, obtained according to one of the above methods, wherein $R_1$ represents hydrogen can be converted to such compounds wherein $R_1$ does not represent hydrogen, e.g. by treatment with reactive esters of alcohols of the formula $R_1-OH$. Hydrohalic acid or toluenesulphonic acid esters are suitable for this purpose. An alkyl group $R_1$ can also be introduced by the method of reductive alkylation, i.e. by reaction with corresponding aldehydes either with hydrogen in the presence of a catalyst or with a reducing agent such as formic acid. The introduction of a hydroxyalkyl group $R_1$ can also be carried out by treating with a corresponding alkylene oxide.

Compounds of formula I in which $R_1$ denotes a hydroxyalkyl group can be subsequently treated with an acylating agent to obtain products wherein $R_1$ represents an alkoyloxyalkyl group. Acid chlorides and acid anhydrides are especially suitable as acylating agents.

Subsequent introduction of a group $R_1$, other than hydrogen, and also subsequent acylation of a hydroxyalkyl group $R_1$ can lead to additional substitution in products in which $R_2$ denotes an amino group; this amino group being additionally substituted.

The bases obtained in this manner are in most cases crystallizable or can otherwise be destilled in high vacuum without decomposition and react with inorganic and organic acids such as hydrochloric acid, hydrobromic acid, sulphuric acid, nitric acid, phosphoric acid, acetic acid, oxalic acid, maleic acid, succinic acid, tartaric acid, toluene sulphonic acid and the like to form pharmaceutically acceptable acid addition salts which are stable in water, in which form the products may also be used.

The bases obtained in the described manner and their acid addition salts are new compounds which can be used as active substances in pharmaceuticals or as intermediates for the production of such substances. They produce a favorable effect on the central nervous system and may therefore be used especially as antiemetics, as indicated previously. The anti-emetic activity is pharmacologically shown by a strong apomorphine antagonising effect in dogs and rats as well as a comperatively weak cataleptic and locomotor activity suppressing effect. Especially pronounced anti-emetic activity is shown by 2-dimethylaminosulphonyl-11-(4-methyl-1-piperazinyl)-dibenz[b,f][1,4]oxazepine obtained according to Example 1 and its acid addition salts.

For such usage, compound (I) may be administered enterally or parenterally as such or admixed with conventional pharmaceutical carriers. They may be administered enterally in such forms as suppositories, tablets, dispersible powders, granules, capsules, syrups and elixirs, and parenterally as solutions, suspensions, dispersions, emulsions, and the like, e.g., a sterile injectable aqueous suspension. The composition for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluent, such as calcium carbonate, sodium carbonate, lactose and talc, granulating and disintegrating agents, e.g., starch and alginic acid, binding agents, e.g., starch, gelating and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90 percent of the active ingredient in combination with the carrier or adjuvant.

The dosage of active ingredient employed for the alleviation of emesis in mammals may vary depending depending on the particular compound employed and the severity of the condition being treated. However, in general, satisfactory results are obtained when the compounds (I) are administered at a daily dosage of from about 0.07 to about 50 milligrams/kilogram of animal body weight. For most large mammals such as primates, the administration of from about 5 to about 400 milligrams of compound (I) per day provides satisfactory results. Preferred dosage forms suitable for internal use comprise from about 10 to about 25 milligrams of the active compound in intimate admixture with a solid or liquid pharmaceutically acceptable carrier or diluent.

The preferred pharmaceutical compositions from the standpoint of preparation and ease of administration are tablets containing about 10 to 25 milligrams of active ingredient.

EXAMPLE 1

1.8 g of 2-dimethylaminosulphonyl-10,11-dihydro-11-oxodibenz[b,f][1,4]oxazepine (m.p. 243°–245° C.) and 0.6 ml of N,N-dimethylaniline are refluxed in 20 ml of phosphorus oxychloride for 4 hours. The excess phosphorus oxychloride is removed completely in vacuo and the residue dissolved in xylene and poured onto ice/water. The xylene solution is shaken out twice with dilute hydrochloric acid and once with water, then dried over sodium sulphate and concentrated to 50 ml in vacuo. Three ml of N-methylpiperazine are added and the reaction mixture is refluxed for 4 hours and then treated with dilute soda lye and water. The xylene phase is separated and shaken out with dilute hydrochloric acid. The acid extracts are made alkaline with concentrated ammonia solution and the base which separates is extracted with chloroform. The chloroform extracts are dried over sodium sulphate and evaporated in vacuo. The residue is crystallized from ether/petroleum ether whereby 1.8 g of 2-dimethylaminosulphonyl-11-(4-methyl-1-piperazinyl)-dibenz[b,f][1,4]oxazepine of melting point 149°–150° C. are obtained.

EXAMPLE 2

A solution of 5.2 g of crude 2-chlorosulphonyl-11-(4-methyl-1-piperazinyl)-dibenz[b,f][1,4]oxazepine, obtained as described below, in 80 ml of chloroform is treated dropwise at room temperature with 50 ml of a 10 percent dimethylamine solution in toluene. The reaction mixture is stirred for a further 2 hours at room temperature, then for 1 hour at 40° C. and finally evaporated to dryness in vacuo. The residue is taken up in dilute acetic acid, treated with active charcoal and made alkaline with concentrated ammonia solution. The base which separates is taken up in benzene, the benzene solution washed three times with water, dried over sodium sulphate and evaporated. The residue is taken up in benzene and filtered through basic aluminum oxide. The residue obtained after evaporation of the solvent is crystallized from acetone/petroleum ether to give 3.2 of 2-dimethylaminosulphonyl-11-(4-methyl-1-piperazinyl)-dibenz[b,f][1,4]oxazepine of melting point 148°–150° C. which is identical to the product obtained according to Example 1.

2-chlorosulphonyl-11-(4-methyl-1-piperazinyl)-dibenz[b,f][1,4]oxazepine used as starting material is obtained as follows:

15.4 g of 2-amino-11-(4-methyl-1-piperazinyl)-dibenz[b,f][1,4]oxazepine (m.p. 153°–156° C.) are dissolved in 50 ml of glacial acetic acid and 15 ml of 38 percent hydrochloric acid and diazotized in the usual manner at 0°–5° C. with a solution of 3.6 g of sodium nitrite in 6 ml of water. The diazonium solution obtained is added within a few minutes while stirring at 10° C. to 40 ml of a 30 percent solution of sulphur dioxide in glacial acetic acid containing 2 g of cuprous chloride. After the development of nitrogen subsides at room temperature the reaction mixture is warmed for 15 minutes at 40° C. The reaction mixture is then diluted to 1 l with water and treated with active charcoal. While stirring and cooling carefully, the basic fraction is precipitated with concentrated soda lye and taken up in chloroform. The chloroform extracts are washed once with dilute soda lye and once with water, dried over sodium sulphate and evaporated. Crude 2-chlorosulphonyl-11-(4-methyl-1-piperazinyl)-dibenz[b,f][1,4]oxazepine is obtained as residue.

EXAMPLE 3

5.4 g of 2-dimethylaminosulphonyl-11-(1-piperazinyl)-dibenz[b,f][1,4]oxazepine obtained according to Example 8 are dissolved in 50 ml of acetone and treated with 1 g of anhydrous potassium carbonate and 2.24 g of ethyl iodide in 20 ml of acetone and refluxed for 3 hours while stirring. The reaction mixture is then evaporated in vacuo and the residue distributed between dilute soda lye and ether. The ether extracts are washed with water and exhaustively shaken out with dilute aqueous hydrochloric acid. The acid extracts are made alkaline with concentrated soda lye and shaken out with chloroform. The chloroform extracts are washed with water, dried over sodium sulphate and evaporated to dryness in vacuo. The residue is crystallized from acetone/petroleum ether to give 4.9 g of 2-dimethylaminosulphonyl-11-(4-ethyl-1-piperazinyl)-dibenz[b,f][1,4]oxazepine of melting point 160°–161° C.

EXAMPLE 4

4.63 g of the same starting material as in Example 3 are dissolved in 80 ml of isopropanol and treated with 1.6 g of anhydrous potassium carbonate, then, while stirring and heating, treated dropwise with 3 g of $\beta$-methoxyethyl-p-toluene sulphonic acid ester in 10 ml of isopropanol. After the addition is complete the mixture is refluxed for 1.5 hours, then evaporated in vacuo. The residue is partitioned between dilute soda lye and ether and the ether extracts exhaustively shaken out with dilute hydrochloric acid. The acid extracts are made alkaline with concentrated soda lye and shaken out with ether. The ether extracts are washed with water, dried over sodium sulphate and evaporated in vacuo. The oily residue is dissolved in warm acetone together with 1.2 g of maleic acid and crystallized by addition of ether. 4.9 g of 2-dimethylaminosulphonyl-11-(4-$\beta$-methoxyethyl-1-piperazinyl)-dibenz[b,f][1,4]oxazepine maleate of melting point 124°–140° C. (decomposition) are obtained.

EXAMPLE 5

Four g of 2-dimethylaminosulphonyl-11-(4-$\beta$-hydroxyethyl-1-piperazinyl)-dibenz[b,f][1,4]oxazepine obtained according to Example 6 are mixed with 30 ml of absolute pyridine and 15 ml of acetic anhydride, left to stand for 1 hour at room temperature and then warmed for a short time on the steam bath. The reaction mixture is evaporated in vacuo and the residue diluted with water. The basic fraction is precipitated in the cold with concentrated soda lye and exhaustively extracted with ether. The ether phase is washed with water, dried over sodium sulphate and evaporated. The residue is dissolved in acetone and treated with 1.8 g of maleic acid. After concentration of the solution and addition of ether crystals precipitate which are recrystallized from aceton/ether to give 3 g of 2-dimethylaminosulphonyl-11-(4-$\beta$-acetoxyethyl-1-piperazinyl)-dibenz[b.f][1,4]oxazepine maleate of melting point 155°–158° C.

Further products corresponding to formula I given in the following table are obtained by analogous procedures to those goven above. In the table $R_1$, $R_2$ and $R_3$ have the above defined meaning. In the column on the right hand side ac means acetone, e = ether, ch = chloroform, me = methanol and pe = petroleum ether.

TABLE

| Ex. | $R_1$ | $R_2$ | melting point |
|---|---|---|---|
| 6 | —CH$_2$—CH$_2$—OH | —SO$_2$N(CH$_3$)$_2$ | base: 164–166°C (from ac/e/pe) |
| 7 | —CH$_2$—CH = CH$_2$ | —SO$_2$N(CH$_3$)$_2$ | base: 150–151°C |
| 8 | H | —SO$_2$N(CH$_3$)$_2$ | base: 181–182°C (from ac/pe) (from ac/pe) |

EXAMPLE 9

For the manufacture of tablets, the products of this invention can be mixed with lactose and granulated with water, 0.5 percent sodium alginate or 1 percent gelatine solution. The dried granulate is compressed into tablets in the presence of about 5 percent of talcum, 5 percent of corn starch and 0.1 percent of magnesium stearate. In this way, there are obtained, e.g. tablets of the following composition:

| | |
|---|---|
| 2-Dimethylaminosulphonyl-11-(4-methyl-1-piperazinyl)-dibenz[b,f][1,4]oxazepine | 10 mg |
| Lactose | 70 mg |
| Corn starch | 5 mg |
| Talcum | 5 mg |
| Magnesium stearate | 0.1 mg |

These 90 mg tablets, which are provided with a crackline, can be administered orally in a dosage of one-half to two tablets one to three times per day in the treatment of subjects suffering from nausea and vomiting following operations or ray treatment or due to stomach or metabolism disorders, intoxications, drug incompatability, pressure on the brain or pregnancy. These tablets may also be used prophylactically against post operative vomiting.

EXAMPLE 10

Dry Filled Capsules

Capsules suitable for oral administration which contain the following ingredients are prepared in a conventional manner. Such capsules are useful in treating emesis at a dose of one capsule two to four times a day.

| Ingredient | Wt. (mg) |
|---|---|
| 2-Dimethylaminosulphonyl-11-(4-methyl-1-piperazinyl)-dibenz[b,f][1,4]oxazepine | 10 |
| Inert solid diluent (starch, lactose, kaolin) | 290 |

EXAMPLE 11

Sterile Solution for Injection

The following ingredients are dissolved in water for injection. The resulting solution is filtered through an appropriate medium to render a clear solution. The solution is then autoclaved to render it sterile.

| Ingredient | Weight (%) |
|---|---|
| 2-dimethylaminosulphonyl-11-(4-methyl-1-piperazinyl)-dibenz[b,f][1,4]oxazepine | 10 |
| Sodium alginate | 0.5 |
| Buffer system | As desired |
| Lecithin | 0.5 |
| Sodium chloride | As desired |
| Water for injection | To desired volume |

EXAMPLE 12

The following formulations for syrups or elixirs containing an effective amount of active compound may be formulated using conventional methods.

|  | Percent by Weight | |
|---|---|---|
|  | syrup | elixir |
| 2-dimethylaminosulphonyl-11-(4-methyl-1-piperazinyl)-dibenz[b,f][1,4]oxazepine | .5–3.5 | .5–3.5 |
| Buffering system | quantity sufficient to adjust pH | |
| Sodium benzoate | .1–.5 | .1–.5 |
| Flavoring agent | .01–.2 | .01–.2 |
| Water | 20–40 | 5–20 |
| Simple syrup U.S.P. | 30–70 | 0 |
| Sorbitol solution (70%) | .5–30 | 20–60 |
| Certified dye | .5–2 | .5–2 |
| Alcohol | 0 | 2.5–20 |
| Methyl paraben | 0 | .05–.1 |
| Propyl paraben | 0 | .05–.1 |
| Sodium saccharin | 0 | .01–.08 |

What is claimed is:

1. A method for treating emesis, which comprises enterally or parenterally administering to a mammal in need of said treatment a compound of the formula:

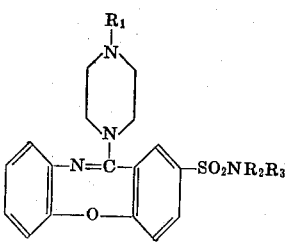

and pharmaceutically acceptable acid addition salts thereof where $R_1$ represents hydrogen, allyl, alkyl containing not more than three carbon atoms, hydroxyalkyl containing not more than three carbon atoms, alkoxyalkyl containing not more than six carbon atoms or alkoyloxy-alkyl containing not more than six carbon atoms and $R_2$ and $R_3$ are the same or different and represent hydrogen or methyl, at a daily dosage of from about 5 milligrams to about 400 milligrams of said compound.

2. A method according to claim 1 in which the compound is 2-dimethylaminosulphonyl-11-(4-methyl-1-piperazinyl)-dibenz[b,f][1,4]oxazepine.

3. A method according to claim 1 wherein the compound is administered to a mammal in need of said treatment in a unit dosage form comprising said compound to the extent of from about 10 milligrams to about 25 milligrams per unit dosage.

* * * * *

UNITED STATES PATENT OFFICE
CERTIFICATE OF CORRECTION

Patent No. 3,683,084    Dated August 8, 1972

Inventor(s) Jean Schmutz, Fritz Hunziker and Franz Martin

It is certified that error appears in the above-identified patent and that said Letters Patent are hereby corrected as shown below:

Assignee:   Sandoz-Wander, Inc.

Hanover, New Jersey  07936

Column 2 line 66   change the word "the" to read --The--.

Column 5 line 36   delete the word "depending".
   and line 37

Signed and sealed this 25th day of December 1973.

(SEAL)
Attest:

EDWARD M. FLETCHER, JR.          RENE D. TEGTMEYER
Attesting Officer                Acting Commissioner of Patents